May 13, 1930.　　　　　G. WAITE　　　　　1,758,871
PARACHUTE RIP CORD
Filed Nov. 16, 1928　　　2 Sheets-Sheet 1
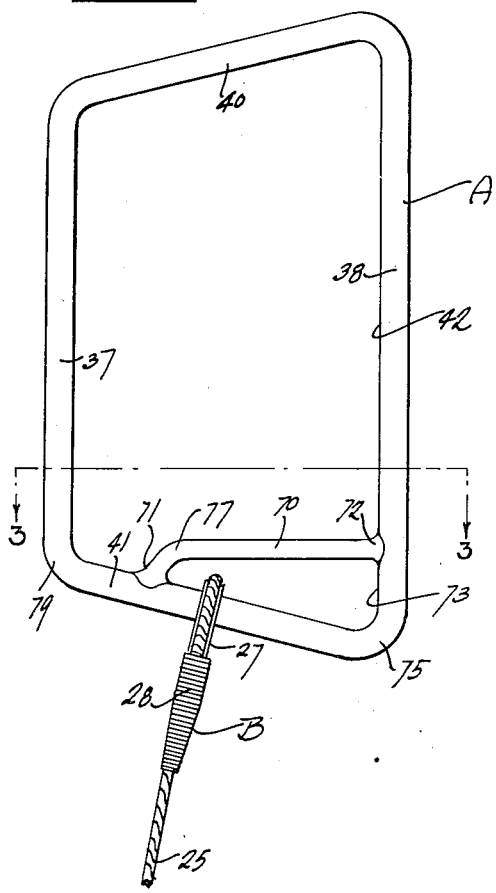
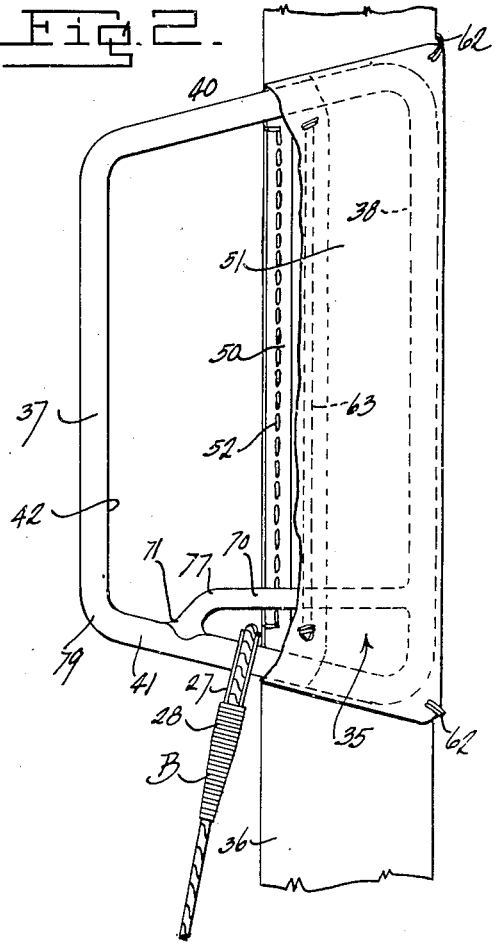
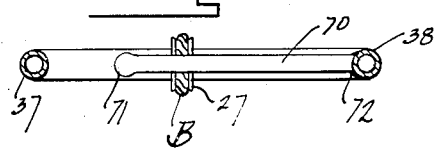
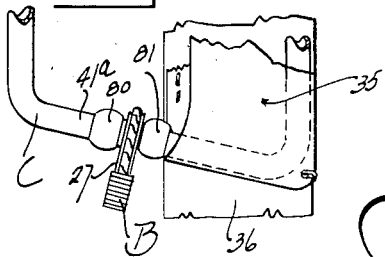
George Waite.
INVENTOR.
BY *Lancaster and Allwine*
ATTORNEYS.

May 13, 1930. G. WAITE 1,758,871
PARACHUTE RIP CORD
Filed Nov. 16, 1928 2 Sheets-Sheet 2
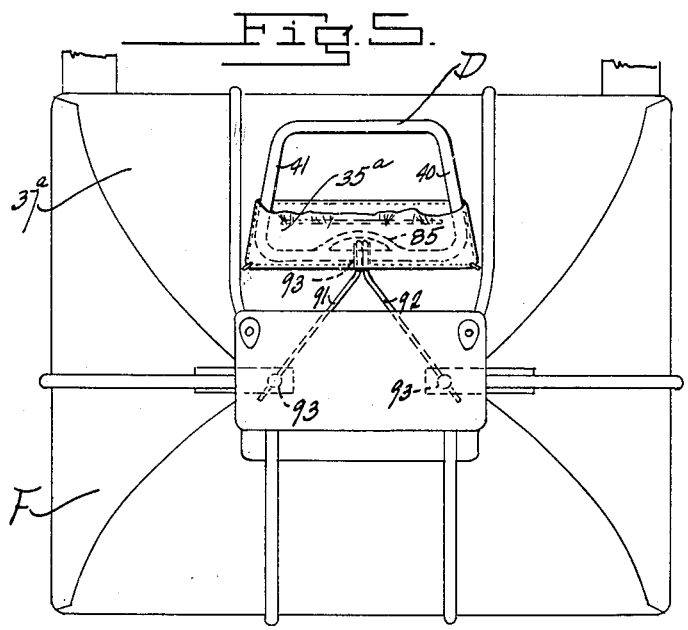
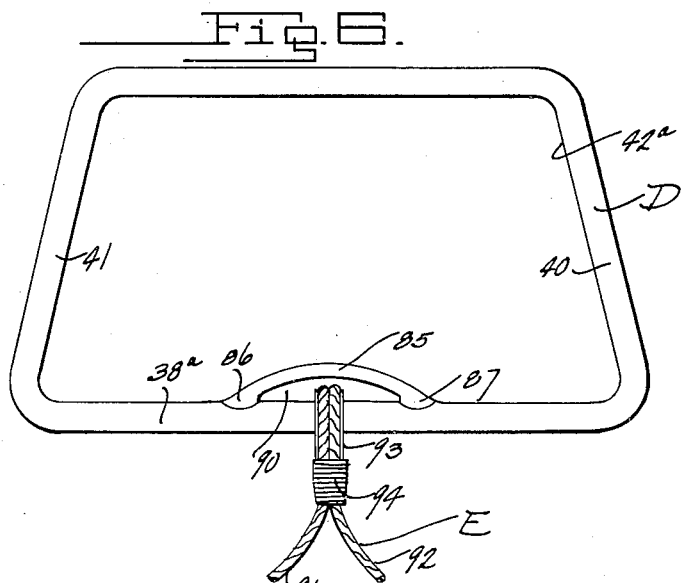
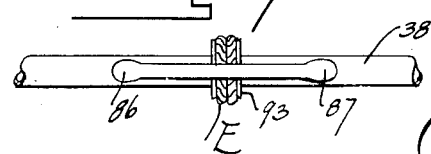
George Waite.
INVENTOR.
BY Lancaster and Allwine
ATTORNEYS.

Patented May 13, 1930

1,758,871

UNITED STATES PATENT OFFICE

GEORGE WAITE, OF BUFFALO, NEW YORK, ASSIGNOR TO IRVING AIRCHUTE COMPANY, INC., OF BUFFALO, NEW YORK, A CORPORATION

PARACHUTE RIP CORD

Application filed November 16, 1928. Serial No. 319,934.

This invention relates to improvements in rip cords, and more particularly with respect to the handles thereof.

The primary object of this invention is the provision of an improved rip cord handle for parachutes, having improved means associated therewith for efficiently connecting a rip cord thereto, for a limited degree of movement with respect to the handle, so that the handle and rip cord may be most efficiently located with certainty in a suitable holder or pocket upon a pack or harness of the parachute apparatus.

A further object of this invention is the provision of an improved rip cord handle of the general formation of the handle set forth in the co-pending application of Leslie L. Irvin, Serial No. 264,844, filed March 26, 1928, and including improvements thereover for ataching a rip cord to the handle for a limited degree of movement with respect thereto, and in position so that the handle may be most efficiently withdrawn or inserted into the pocket provided therefore on conventional parachute apparatus.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved rip cord handle, showing the rip cord attached thereto in an improved relation.

Figure 2 shows the handle and rip cord in the usual relation in which they are supported upon a strap of the parachute harness, in position to be readily grasped and removed when the parachute is to be released.

Figure 3 is a sectional view taken substantially on the line 3—3 of Figure 1.

Figure 4 is a fragmentary view of a modified form of the invention.

Figure 5 is a view showing a further modified form of improved rip cord handle intended for use on the lap pack type of parachute; the rip cord and its handle being shown in position in a pocket carried by the flexible casing of the parachute pack.

Figure 6 is a view showing the improved rip cord handle for the lap and chest types of parachute packs.

Figure 7 is a fragmentary sectional view showing a detail of the rip cord handle of the modification shown in Figure 6.

In the drawings, wherein for the purpose of illustration are shown preferred and modified forms of the invention, the letter A may generally designate the preferred form of rip cord handle to which a rip cord B is adapted to be connected. This type of rip cord assemblage may be used for the seat and back types of parachutes, as conventionally used by the United States Government and manufactured by the Irving Airchute Company, of Buffalo, New York. For such types of packs, a modified form of handle C shown in Figure 4 of the drawings, may also be used. A further modified form of handle D for a rip cord E is intended to be employed in connection with the lap and chest pack type of parachute.

The rip cord B includes the flexible cord body 25, formed of a plurality of spirally wrapped wire strands, which at the parachute pack engaging end is provided with suitable pins (not shown), the construction of which is more particularly described in the co-pending application of Mr. Leslie L. Irvin, above referred to, and which are intended to releasably hold the flaps of a parachute container of the type set forth in the G. M. Ball U. S. Patent #1,554,192, granted September 22, 1925. At its handle connecting end the flexible rip cord body 25 is looped about a peripheral channel of a rigid metallic eye 27, and the end wire wrapped as at 28, and the eye receives the rip cord handle or ring loosely therethrough.

The handle A of the rip cord assembly is of a shape which will permit of its secure and easily detachable connection in a simple form of pocket 35, placed either upon the body strap 36 of the harness worn by the parachute jumper, or on a flap 37ª of the chest or lap type of parachute pack, shown at F in Figure 5 of the drawings. The handle A is preferably of tubular steel material, although it may be solid if desired. It is preferably bent from a single length of material to the form shown, and the ends suitably welded permanently at any desired location. A characteristic of the handle A, is the fact that the same is not circular, such as has heretofore been used by the United States Government, but is the configuration set forth in the Leslie L. Irvin co-pending application above referred to. It is formed in the shape of a trapezoid; the non-parallel sides of which diverge in equal angular relation with respect to the parallel sides. The shape may vary substantially from this arrangement, if desired, so far as the present invention is concerned, except as the invention is qualified in the claims. Thus, the handle A includes the parallel straight portions 37 and 38; the latter being the longer, and the ends of which are connected by the non-parallel portions or sides 40 and 41 which diverge from the ends of the portion 37 to the ends of the portion 38, and making equal angles at their respective connections with the ends of the portions 37 and 38. The opening 42 formed between the portions 37, 38, 40, and 41 is trapezoidal in form, and has its length parallel with the sides 37 and 38, and the depth normal to the sides 37 and 38 is of less dimension.

The pocket 35 is of flexible material, and has a back portion 50 and a front movable portion 51. The pocket 35 is relatively long and shallow in depth, and the back 50 is adapted to be stitched at 52 to the harness, as in the case of the back and seat types of packs, and to the parachute flap 37ª as in the case of the chest or lap types of parachute packs; the corners of the pocket being stitched as at 62, with the harness or container to which the respective pocket is attached. The stitching 52 enables the entrance end of the pocket to be restricted, while the corner stitching 62 holds the pocket at its bottom to a definite length. The restriction is normally accomplished by providing an elastic cord 63, such as shown in the drawings, secured at its ends to the front 51 of the pocket, near the entrance to the pocket, and which holds the pocket opening in a sort of trapezoidal shape, to conform to the shape of the rip cord handle to be received therein.

When the handles A, C, or D are placed in this type of pocket 35, the elastic 63 draws the material of the parts of the pocket snugly into conformity about the divergent side portions 40 and 41 of the handle, to hold the handle in place against liability of accidental detachment. Substantially one-half of the width of the handle protrudes from the opening of the pocket, which extended portion has a long opening to enable a quick and efficient grasp of the handle when the parachute is to be released for a descent.

To permit of some relative movement of the rip cord B along the handle and to insure that it will not become displaced from a particular zone on the handle, so that the rip cord will always bear the same relation to the pocket, during insertion, I prefer to provide a retaining bridge 70, of circular or cylindrical cross section, either solid or hollow, which is of less diameter or cross sectional area than a cross section of the tubular material on the handle, and which bridge 70 is preferably secured at its ends 71 and 72, in a welded relation upon the handle at spaced points, providing a small substantially triangular shaped loop or opening 73, lying within the plane of the handle opening 42. The bridge piece 70 is welded at 72, or otherwise efficiently secured to the portion 38 of the handle A spaced a short distance from the bend connection 75 of the handle portions 38 and 41, as shown in Figure 1. The bridge piece 70 extends normal to the handle portion 38 for its major length, and at its opposite end is bent at 77 and has the above mentioned connection 71 welded or otherwise rigidly secured on the portion 41 on the handle A, closer to the bend connection 79 of the handle portions 37 and 41 than the bend connection 75 above mentioned. This bridge piece 70 and its connections lie entirely within the planes of the opposite sides of the handle A, and as is shown in Figure 3, and do not form any obstructions which hinder the insertion or removal of the rip cord handle with respect to the pocket 35. It is well shown in Figure 2 that the bridge piece 70 is of sufficient length that the obstructing connection 71 lies exteriorly of the pocket 35 when the rip cord handle is contained within the pocket. A small portion of the opening 73 also lies exteriorly of the pocket. As shown in the drawings, the rip cord has its eye connection 27 on the handle A between the obstructing connections 71 and 72 of the bridge piece 70, and the movement of the rip cord proper along the handle is limited by the said connections of the bridge piece 70 with the handle. This type of retainer for limiting the amplitude of movement of the rip cord on the handle is a more efficient and strengthening construction than the retaining bulge or obstruction set forth in the Leslie L. Irvin co-pending application above referred to.

It is not essential that the retaining bar or member 70 be of the shape and have the connections shown in the preferred type of rip cord handle A, since the same may be of other shapes and have both its end connections on the bar 41. It is of course an important part of the invention that for the preferred type of handle the rip cord connection on the handle be located exteriorly of the pocket in non-obstructing relation thereon when the handle is contained within the pocket, as shown in Figure 2.

In the modified form of invention shown in Figure 4, the handle B has its eye threaded on the bar portion 41ᵃ of the rip cord handle C, which is of the same formation as the handle A above described. On the bar 41ᵃ, in spaced relation, are provided obstructions or bulges 80 and 81, between which the eye 27 of the rip cord B is disposed, in such relation that the eye may be moved between the bulges 80 and 81, but not thereover, due to the size of the eye.

In the modified form of rip cord handle D, the same is the same configuration as the handle A above described, and in so far as consistent similar reference characters designate corresponding parts in these two forms of handles. The handle D is intended to be carried directly upon the exterior of the container of the parachute pack, in a pocket substantially the same as that above described. In this handle the longer pocket inserting bar 38ᵃ is provided with an arcuated retaining bar or member 85, which has its ends secured at 86 and 87 on the bar 38ᵃ in spaced relation, at substantially equal distances from the end connections of the side bars 40 and 41, as shown in Figure 6. The retaining bar or piece 85, from its end connections 86 and 87, arcuates in a divergent relation from the bar 38ᵃ of the handle on which it is mounted, within the area of the opening 42ᵃ of the handle D, providing a small opening 90 which is elongated along the bar 38ᵃ, and which defines the limits of movement of the rip cord E along said handle. The rip cord E for this type of rip cord assembly preferably comprises flexible rip cord lengths 91 and 92, which, as shown in Figure 5, have their pin ends releasably connected to suitable studs 93 on the pack, when the latter is folded; the cord bodies 91 and 92 beng suitably wound around a peripheral channel of an eye piece 93 and the ends thereof being connected in this relation by means of spirally wrapped wire 94, shown in Figure 6. The eye 93 of course receives the bar portion 38ᵃ of the handle D in a threaded relation therethrough, so that the eye 93 may be moved between the end connections 86 and 87 of the retaining piece 85. This positively holds the rip cord onto the handle D for a limited amplitude of movement, and the rip cord cannot be displaced from its proper position on the handle D. Instead of being arcuated, the piece 85 may be of any approved shape which will provide the end obstructions, such as 86 and 87, defining and limiting the amplitude of movement of the rip cord along the bar portion 38ᵃ of the handle D, so as to retain the connection of the rip cord at a location on the handle D which is substantially midway between the ends of the bar 38ᵃ. This, for the reason that the pocket 35ᵃ, shown in Figure 5, has an opening in the bottom thereof, through which the rip cord lengths 91 and 92 extend for their releasable connection with the parts of the pack, which are well understood in this art. Of course, upon pulling the handle D, from the position shown in Figure 5, to release the parachute, the entire rip cord assemblage pulls out of the pocket 35ᵃ, including not only the handle, but the rip cord E as well.

The importance of properly confining the rip cord to a definite location on the handle should not be underestimated. If there is any opportunity afforded for catching of the rip cord proper in the pocket or adjacent parts of the parachute apparatus, a life may be sacrificed. The manner in which this is accomplished with the improved rip cord handles gives not only the very highest factor of safety, but leaves all parts of the rip cord body and handle in an exposed easily inspected relation.

Various changes in the shape, size, and arrangement of parts may be made to the forms of invention herein shown and described, without departing from the spirit of the invention or the scope of the claims.

I claim:

1. As an article of manufacture a parachute rip cord assembly comprising a handle of endless loop-forming rigid material arranged in the form of a trapezoid and providing an elongated hand inserting opening therein, a rip cord body having a slidable connection on the material of the handle spaced from the narrower end of the trapezoid, and means on the handle forming obstructions at opposite sides of the rip cord body connection on the handle to limit the amplitude of movement of the former along the latter to a location spaced from the said narrower end of the trapezoid.

2. In a parachute rip cord assembly the combination of a handle of substantially trapezoidal formation formed of bar portions connected in endless relation, a flexible rip cord body slidably connected on one of the non-parallel bar portions of the trapezoidally formed handle, and means on the handle at opposite sides of the connection of the cord body thereon to limit the amplitude of sliding movement along the bar portions.

3. In a parachute rip cord assembly the combination of an endless loop-like handle having a hand inserting opening therein, a rip cord body having an exposed connection on the handle, and means disposed entirely within the plane of the opening of the handle connected with the handle at opposite sides of the connection of the rip cord body therewith to permit limited sliding of the rip cord body connection along the handle.

4. In a rip cord assemblage for parachutes the combination of a loop forming handle having a hand inserting opening therethrough, a rip cord body having an exposed connection on said handle, and a bar disposed entirely within the plane of the opening of said handle having connection on the handle at its ends at opposite sides of the connection of the rip cord body on the handle to limit the amplitude of movement of the rip cord body along the handle.

5. In a parachute rip cord construction the combination of a loop-forming handle, a flexible rip cord body having an eye through which the handle is loosely and movably threaded for connection of the rip cord to the handle, and a retaining bar secured rigidly at its ends to the handle within the loop opening thereof with its ends connected at opposite sides of the connection of the rid cord eye on the handle, and bridging across the eye to provide a minor opening in the plane of the handle within which the rip cord eye connection may be slid for limited movement along the handle.

6. As an article of manufacture a rip cord handle of substantially trapezoidal formation having a hand inserting opening therein, and a retaining bar connected within the plane of said opening with its ends connected to the handle and otherwise being spaced from the adjacent portions of the handle to provide an elongated rip cord connection receiving opening.

7. In a parachute rip cord construction the combination of a loop handle having a hand inserting opening therein, a parachute rip cord body having a loose exposed eye connection on the handle, and retaining enlargments on the handle at opposite sides of the eye to limit the movement of the eye connection of the rip cord body along the handle.

8. In a parachute rip cord construction the combination of a substantially trapezoidally formed handle, shaped of bar material to provide parallel portions of unequal lengths, the shorter of which is the hand grasping portion, and side bar portions connecting the ends of said substantially parallel portions and divergently extending relative to each other away from the shorter towards the longer of said substantially parallel bar portions, and a retaining bar connected at its ends to the material within the handle opening and being of less cross section than the cross section of the bar portions of the handle and so related thereto as to provide an elongated minor opening thru which a rip cord may be extended in a loose connection upon said handle.

9. In a rip cord construction for parachute apparatus a handle of bar material formed in the shape of a trapezoid, comprising long and short substantially parallel bar portions and connecting sides extending divergently from the ends of the shorter to the longer of the substantially parallel bar portions, a rip cord having a movable connection upon one of the divergent sides of the handle, and a retaining bar within the plane of the opening of the handle affixed to the handle at opposite sides of the cord connection and providing an elongated loop for limiting the movable connection of the rip cord body therealong.

10. In a rip cord construction for parachute apparatus a handle of bar material formed in the shape of a trapezoid comprising long and short substantially parallel bar portions and connecting sides extending divergently from the ends of the shorter to the longer of the substantially parallel bar portions, a rip cord having a movable connection upon one of the divergent sides of the handle, a retaining bar within the plane of the opening of the handle connected to the handle at opposite sides of the cord connection and providing an elongated loop for limiting the movable connection of the rip cord body therealong, said retaining bar having one end connected rigidly upon the longer of the parallel portions of the handle adjacent to the divergent side on which the rip cord is connected and the opposite end of the retaining bar being connected to the said divergent side on which the rip cord body is connected at the opposite side of said cord connection from the first mentioned connected end of said retaining bar.

11. In parachute rip cord construction for parachute apparatus a pocket having a restricted opening thereto, a bar-like handle in the form of a loop and shaped for frictional releasable fitting in the pocket with a hand grasping portion extending therefrom, means in the opening of said handle defining a minor loop opening exteriorly of the pocket when the handle is therein, and a rip cord having an exposed movable connection in said minor loop opening at a location exteriorly of the pocket and laterally of the hand grasping portion of said handle.

12. In parachute rip cord apparatus a pocket of elongated formation and shallow depth having an elongated restricted expansible opening thereto, a substantially trapezoidally formed handle of bar-like material having an opening therein conforming to the shape of the handle, the handle being of greater depth than the pocket and at its wider end being adapted to fit into the pocket with the sides of the handle convergently extending along the ends of the pocket and with the smaller end of the handle projecting from the pocket and providing an elongated hand inserting opening and hand grasping portion, a rip cord body having a connection on a side of the handle exteriorly of the pocket when the handle is releasably received therein, and retaining portions on the handle at opposite sides of the connection of the rip cord thereon for limiting the amplitude of movement of the rip cord connection upon said handle.

13. In a parachute rip cord construction a handle of bar-like material in the form of an elongated hand inserting loop, a flexible rip cord body including detent pins and having a closed eye at an end thereof thru which a bar of the handle is loosely threaded in a wholly exposed and readily inspected connection, and obstructions rigid on the bar material of the handle at opposite sides of the eye and lying wholly within the plane of the loop opening of the handle and of a nature to limit the longitudinal movement of the rip cord eye connection along the handle.

14. In a parachute rip cord and handle construction, the combination of a handle having a hand inserting opening therethrough, the opposite outer edges of the handle being convergent from a wider end of the handle towards an opposite narrower hand engaging portion forming a boundary of said opening, a flexible rip cord body connected to the handle at a location spaced from the narrower hand hold portion of the handle, and obstructions on the handle at opposite sides of the connection of the flexible rip cord with the handle at the location spaced from the narrower hand hold portion of the handle to limit the movement of the rip cord connection upon the handle whereby to prevent interference with an efficient grasp of the narrower hand hold portion by an operator.

15. In a parachute rip cord and handle construction the combination of a handle substantially the shape of a trapezoid including a short hand hold portion, an opposite longer base portion and side portions rigidly connected with the ends of the hand hold and base portions and relatively divergent from the opposite ends of the handle portion to the opposite ends of the base portion, a flexible rip cord having a connection with the handle, and means on the handle for maintaining the rip cord at its connection on the handle at a location remote from the shorter hand hold portion of the handle.

16. In a parachute rip cord construction a handle of substantially trapezoidal formation including parallel portions of unequal length, the shorter of which is a hand hold portion, and side portions divergently extending from connections at the ends of the hand hold portion to connections at the ends of the other of the parallel portions, a rip cord body having an exposed loose connection on the handle, and obstructions connected on the handle at opposite sides of the rip cord connection thereon to prevent movement of the rip cord connection upon any part of the hand hold portion of the handle, one of said obstructions being rigid with one of the side portions of the handle at a location between the connection of the rip cord handle therewith and the hand hold portion.

GEORGE WAITE.

DISCLAIMER 1,758,871.—*George Waite*, Buffalo, N. Y. PARACHUTE RIP CORD. Patent dated May 13, 1930. Disclaimer filed September 15, 1932, by the assignee, *Irving Air Chute Company, Inc.*

Hereby enters this disclaimer to that part of said specification which is in the following words; to wit:

"Figure 4 is a fragmentary view of a modified form of the invention". (p. 1, lines 45 and 46.)

"For such types of packs, a modified form of handle C shown in Figure 4 of the drawings, may also be used". (p. 1, lines 69–72.)

"C". (p. 2, line 54.)

"In the modified form of invention shown in Figure 4, the handle B has its eye threaded on the bar portion 41$^a$ of the rip cord handle C, which is of the same formation as the handle A above described. On the bar 41$^a$, in spaced relation, are provided obstructions or bulges 80 and 81, between which the eye 27 of the rip cord B is disposed, in such relation that the eye may be moved between the bulges 80 and 81, but not thereover, due to the size of the eye". (p. 3, lines 1–11.)

Your petitioner also disclaims from the scope of claims 1, 2, 7, 12, 14, 15, and 16 any parachute rip-cord handle except one in which the means for limiting the sliding movement of the rip-cord body connection along the rip-cord handle consists of a retaining member secured at its ends to the handle on opposite sides of the rip-cord connection.

*(Official Gazette October 11, 1932.)*